(12) United States Patent
Andrews

(10) Patent No.: US 10,739,194 B2
(45) Date of Patent: Aug. 11, 2020

(54) INDEXED MULTIPLE SLIT SLIDER

(71) Applicant: FIAT LUX PHOTONICS Inc., Berkeley, CA (US)

(72) Inventor: David Scott Andrews, Berkeley, CA (US)

(73) Assignee: FIAT LUX PHOTONICS Inc., Berkeley, CA (US)

( * ) Notice: Subject to any disclaimer, the term of this patent is extended or adjusted under 35 U.S.C. 154(b) by 73 days.

(21) Appl. No.: 16/237,700

(22) Filed: Jan. 1, 2019

(65) Prior Publication Data

US 2019/0219442 A1 Jul. 18, 2019

Related U.S. Application Data

(60) Provisional application No. 62/617,548, filed on Jan. 15, 2018.

(51) Int. Cl.
| | | |
|---|---|---|
| *G01J 3/04* | (2006.01) | |
| *G01J 1/04* | (2006.01) | |
| *G01J 3/02* | (2006.01) | |

(52) U.S. Cl.
CPC ............. *G01J 3/04* (2013.01); *G01J 1/0403* (2013.01); *G01J 1/0451* (2013.01); *G01J 1/0462* (2013.01); *G01J 3/0202* (2013.01); *G01J 2003/045* (2013.01)

(58) Field of Classification Search
CPC .......... G01J 2003/045; G01J 2003/042; G01J 2003/047; G01J 3/04; G01J 1/0403; G01J 1/0451; G01J 1/0462; G01J 3/0202
See application file for complete search history.

(56) References Cited

U.S. PATENT DOCUMENTS

| | | | | |
|---|---|---|---|---|
| 3,211,056 A | * | 10/1965 | Goldstein | G01J 3/04 359/232 |
| 3,365,262 A | * | 1/1968 | Newcomer | G01J 3/04 359/232 |
| 3,489,485 A | * | 1/1970 | Marcovecchio | G01J 3/04 359/232 |
| 5,060,283 A | * | 10/1991 | Shiraishi | H04N 1/00002 250/237 R |
| 5,627,671 A | * | 5/1997 | Yamura | G01J 3/04 356/326 |
| 7,202,949 B2 | * | 4/2007 | Weeks | G01J 3/04 356/319 |
| 8,638,433 B1 | * | 1/2014 | Amend | G01J 3/42 356/319 |
| 2004/0070807 A1 | * | 4/2004 | Hoshino | G02B 5/005 359/232 |

* cited by examiner

*Primary Examiner* — Michael P LaPage
(74) *Attorney, Agent, or Firm* — Patent Office of Dr. Chung Park

(57) ABSTRACT

A slit slider assembly for providing a plurality of slits. The slit slider assembly includes: a holder including a first channel and a pair of set screws that each has a ball partially extruding into the first channel; and a slit carrier assembly configured to be slidably disposed in the first channel and carry a slit mask that includes a plurality of slits, the slit carrier assembly including a plurality of dimples for receiving a portion of the ball. When the balls of the pair of set screws engage two dimples of the plurality of the dimples, the holder is configured to pass light through one of the plurality of slits that corresponds to the two dimples.

20 Claims, 10 Drawing Sheets

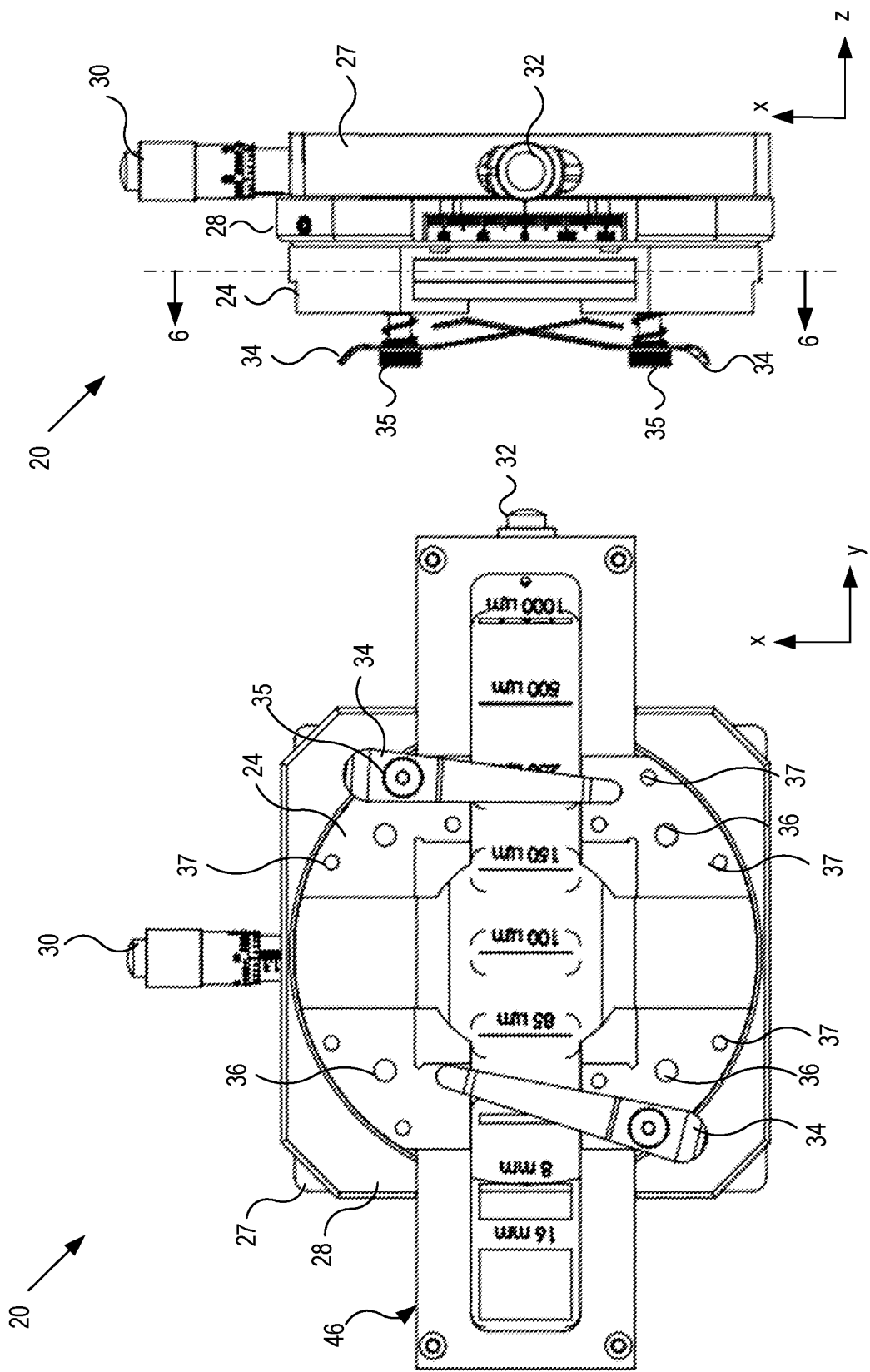

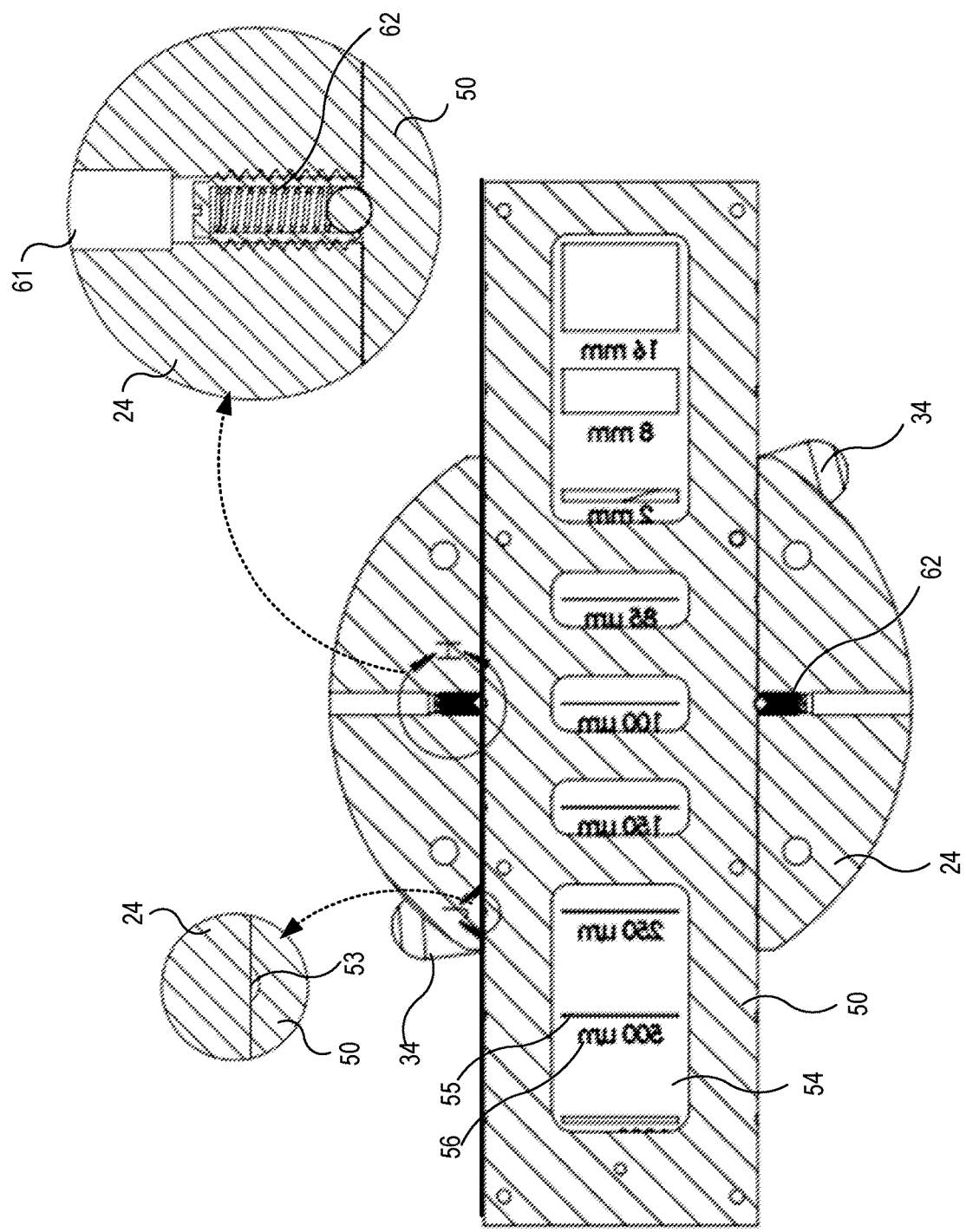

US 10,739,194 B2

INDEXED MULTIPLE SLIT SLIDER

CROSS-REFERENCE TO PRIOR APPLICATIONS

This application claims priority of U.S. Provisional Patent Application No. 62/617,548, filed on Jan. 15, 2018, which is hereby incorporated by reference in its entirety.

BACKGROUND

A. Technical Field

The present invention relates to optical apparatus, and more particularly, to devices having input slits that are used in imaging devices.

B. Background of the Invention

Conventional streak cameras and spectrometers use continuously adjustable slits. Typically, the continuously adjustable slit includes a housing within which two blades are held in a mechanism that allows the two blades to be opened or closed with an adjustment knob. Often there are makings on the knob that gives an indication of the approximate slit gap, i.e., aperture width. However, it is difficult to know the exact size of the gap without inserting a feeler gauge into the gap.

Also, the continually adjustable slit has mechanical problems. For instance, springs may come free so that the opposing slit blades become loose and not be perfectly parallel to each other. In another example, some cameras use single fixed slits and they have the problems that either the widths of the slits cannot be adjusted or changing slits requires time consuming bolt removal and installation. As such, there is a need for a slit unit that allows an operator to change the slit width quickly without compromising the accuracy in the slit width or position.

SUMMARY OF THE DISCLOSURE

In one aspect of the present invention, an Indexed Multiple Slit Slider (IMSS) assembly includes: a holder that includes a first rectangular channel with a ~5/1 aspect ratio and two set screws that face each other across the center of the longitudinal axis of the first channel and that each have a spring loaded ball partially extruding into the first channel; and a slit carrier assembly configured to be snuggly inserted in the first channel, and carry a slit mask that includes a plurality of slits of varying widths. The slit carrier assembly includes multiple opposing pairs of dimples for each slit such that a reference line drawn from the deepest portion of one dimple to the deepest portion of the opposing dimple passes through the center of the slit that the pair of dimples is indexing. When the balls of the two set screws engage two opposing dimples, the holder passes light through the slit that corresponds to the two dimples. In this way, each time a slit is selected by the operator, the center of the selected slit is in the same place in the IMSS assembly and on the streak camera photo cathode.

In another aspect of the present invention, an optical device includes: a slit slider assembly for passing a light through; and a body attached to the slit slider assembly and configured to process the light. The slit slider assembly includes: a holder including a first channel and a pair of set screws that each has a ball partially extruding into the first channel; and a slit carrier assembly configured to be slidably disposed in the first channel and carry a slit mask that includes a plurality of slits, the slit carrier assembly including a plurality of dimples for receiving a portion of the ball. When the balls of the pair of set screws engage two dimples of the plurality of the dimples, the holder passes the light through one of the plurality of slits that corresponds to the two dimples.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 2B shows a front view of the IMSS assembly in FIG. 2A according to embodiments of the present disclosure.

FIG. 2C shows a side view of the IMSS assembly in FIG. 2A according to embodiments of the present disclosure.

FIG. 6 shows a cross sectional view of the IMSS assembly in FIG. 2C, taken along the line 6-6, according to embodiments of the present disclosure.

DETAILED DESCRIPTION OF THE PREFERRED EMBODIMENTS

Figure 1:
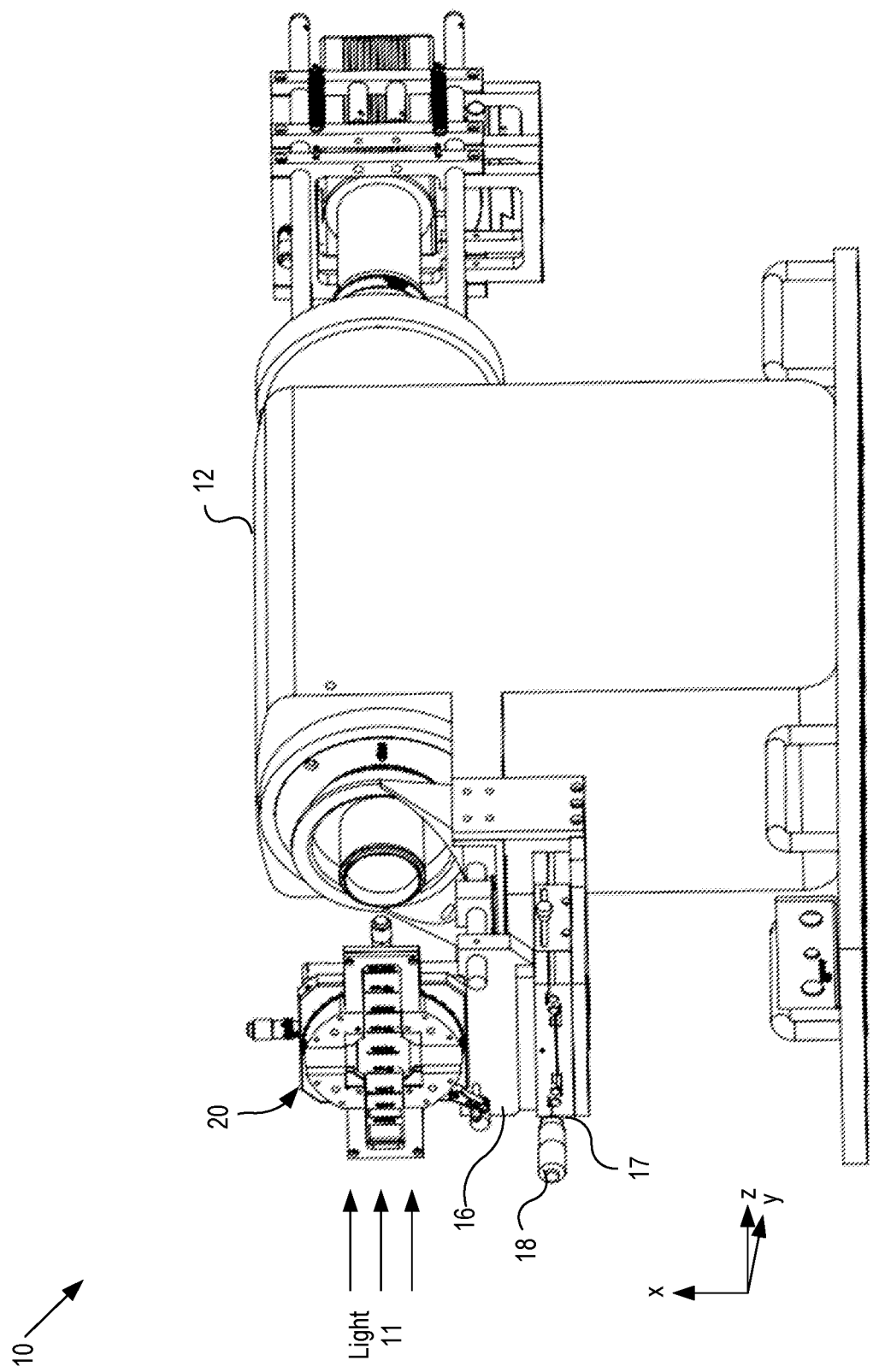
FIG. 1 shows a perspective view of an optical device according to embodiments of the present disclosure.

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

In the present drawings, like reference numeral designates like or corresponding parts throughout the several views. Also, the terms horizontal and vertical do not necessarily refer to the absolute orientations in space. For instance, a horizontal channel may become a vertical channel, depending on the orientation of the component that has the channel.

The present invention relates optical devices, such as streak camera and spectrometer, that have input slits, where having an accurate parallel slit width is critical to the accurate operation of the optical devices.

FIG. 1 shows a perspective view of an optical device 10 according to embodiments of the present disclosure. In embodiments, the optical device 10 may be any instrument that captures optical images, such as streak camera, spectrometer, x-ray, pinhole camera, and panorama camera. However, for the purpose of illustration, it is assumed that the optical device 10 is a streak camera in the following section.

As depicted, the streak camera 10 may include: a camera body 12 having various electrical and mechanical components for capturing and processing the images; a translation stage 17 having a micrometer 18 and secured to the camera body 12; an indexed multiple slit slider (IMSS) assembly 20; and a mount 16 secured to the translation stage 17, the IMSS assembly 20 being mounted on the mount 16. In embodiments, the micrometer 18 may be operated to change the distance between the IMSS assembly 20 and the camera body 12 along the z (optical axis) direction.

It is noted that other suitable number and types of mounts and translation/rotation stages may be used to arrange the IMSS assembly 20 relative to the camera body 12. For instance, one or more rotation stages (not shown in FIG. 1) may be mounted on the translation stage 17 so that the IMSS assembly 20 may be rotated relative to the camera body 12.

Figure 2A:
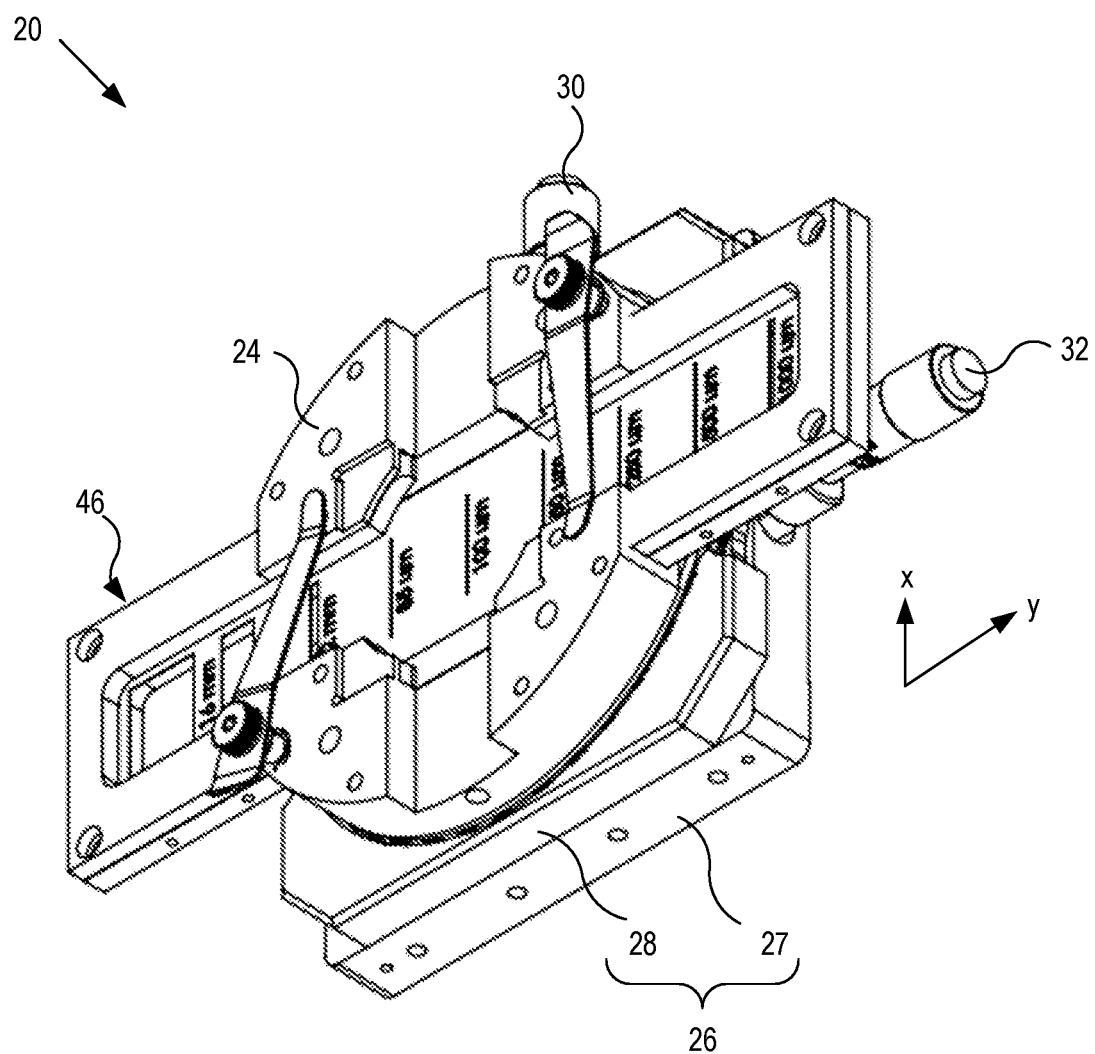
FIG. 2A shows a perspective view of an IMSS assembly according to embodiments of the present disclosure.
Figure 2D:
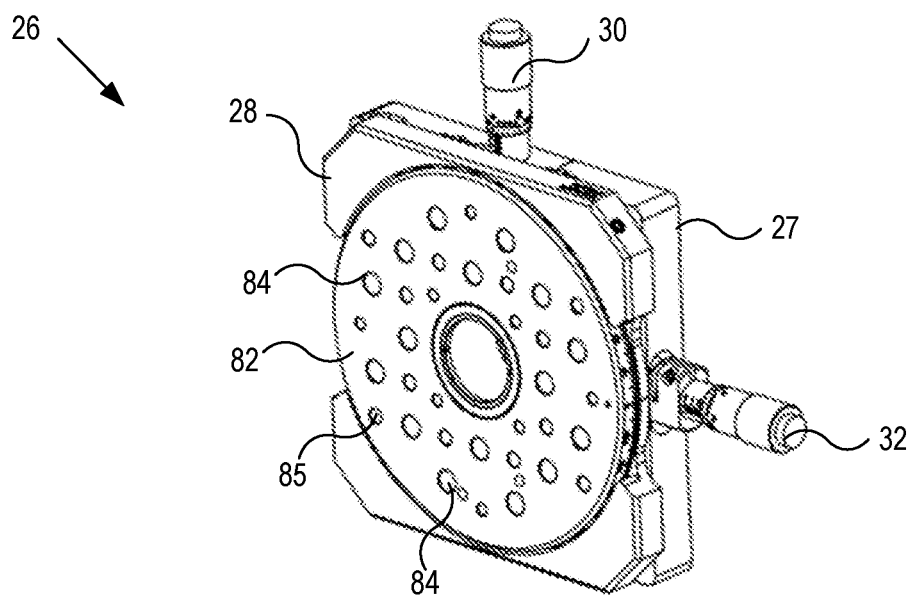
FIG. 2D shows a perspective view of translation and rotation stages of the IMSS assembly in FIG. 2A according to embodiments of the present disclosure.

In embodiments, the IMSS assembly 20 may limit the light 11 in the eventual temporal axes and establish an image plane for inputting optical signals. FIG. 2A shows a perspective view of the IMSS assembly 20 according to embodiments of the present disclosure. FIG. 2B shows a front view of the IMSS assembly 20 according to embodiments of the present disclosure. FIG. 2C shows a side view of the IMSS assembly 20 according to embodiments of the present disclosure. FIG. 2D shows a perspective view of translation and rotation stages of the IMSS assembly in FIG. 2A according to embodiments of the present disclosure. As depicted, the IMSS assembly 20 may include: a translation stage 26 including a base plate 27 and a stage plate 28 slidably secured to the base plate 27; a rotation stage 82 secured to the stage plate 28; a first micrometer 30 for moving the stage plate 28 relative to the base plate 27 in the x (vertical) direction; a second micrometer 32 for moving the stage plate 28 relative to the base plate 27 in the y (horizontal) direction; a holder 24 secured to the rotation stage 82 by one or more bolts/screws that engage holes 41 (shown in FIG. 3) and having multiple channels/cutouts for accommodating multiple slit masks/optical elements; a slit carrier assembly 46 mounted in the horizontal channel of the holder 24; and a pair of spring-loaded optic clips (or shortly spring clips) 34. In embodiments, the rotation stage 82 may be rotated along the z-axis so that the holder 24 may be also rotated relative to the stage plate 28. In embodiments, the rotation stage 82 may include multiple holes 84 and 85 for receiving screws therein.

In embodiments, the IMSS assembly 20 may include multiple tapped holes 37, where a pair of spring clip shoulder bolts 35 may engage two of the multiple tapped holes 37. In embodiments, the pair of spring clips 34 may be mounted on the pair of spring clip shoulder bolts 35 and used to apply pressure on a rectangular disk shaped optic component (such as 2"×2" optical diffuser), as discussed in conjunction with FIG. 8.

In FIGS. 2A-2C, the holder 24 includes eight tapped holes (such as M4 holes) 37, four holes (such as M6 holes) 36 and six holes 41. However, it should be apparent to those of ordinary skill in the art that the holder 24 may have other suitable number of holes 36, 37 and 41.

Figure 3:
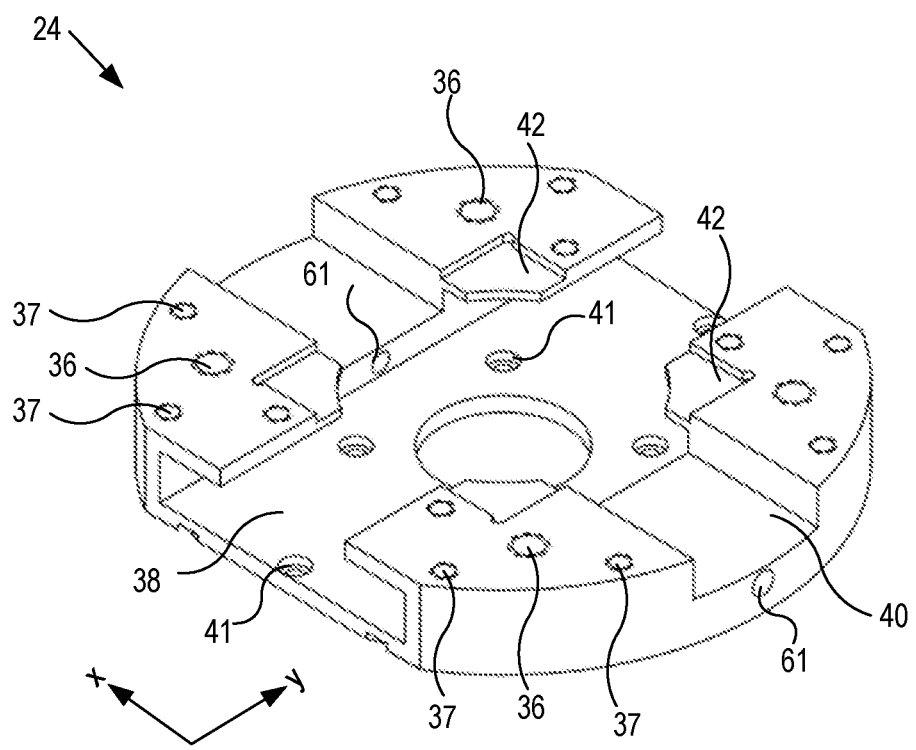
FIG. 3 shows a perspective view of a holder according to embodiments of the present disclosure.

FIG. 3 shows a perspective view of the holder 24 according to embodiments of the present disclosure. As depicted, the holder 24 may include: a horizontal channel/cutout 38 in which the slit carrier assembly 46 may fit snugly; a vertical channel/cutout 40 that extends along the x (vertical) axis; a front cutout 42 for receiving a square optic component therein, such as neutral density filters or wavelength separating filters; multiple external component mounting holes 36; and a pair of holes 61 in which a pair of spring-loaded ball-end screws 62 (shown in FIG. 6) are installed. In embodiments, the holder 24 may be able to hold three optical elements in the three channels/cutouts 38, 40, and 42, simultaneously.

Figure 4A:
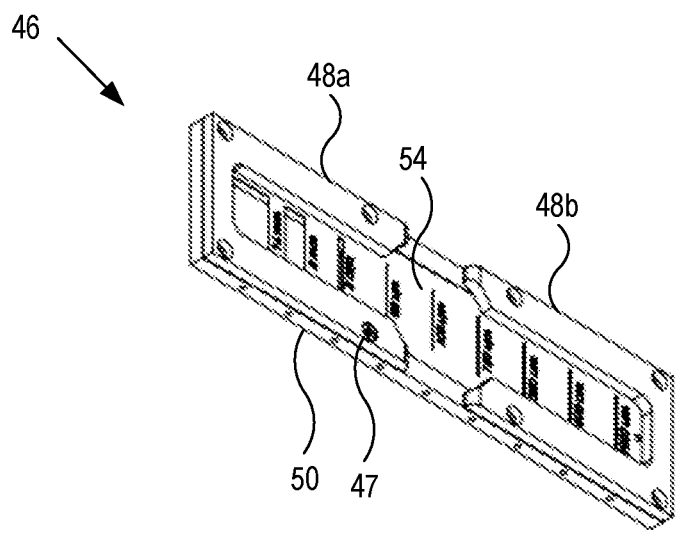
FIG. 4A shows a perspective view of a slit carrier assembly according to embodiments of the present disclosure.
Figure 4B:
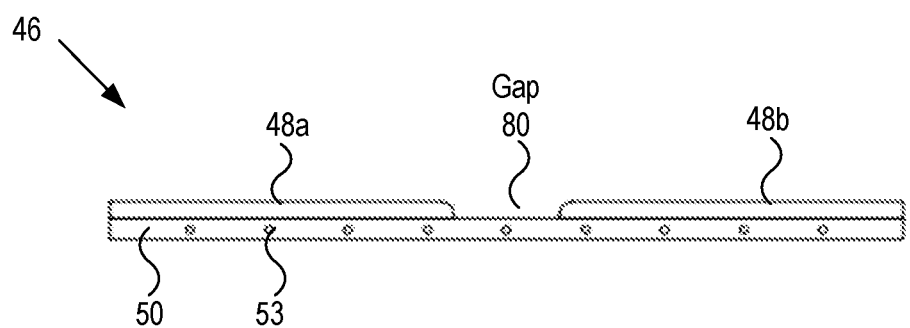
FIG. 4B shows a side view of the slit carrier assembly in FIG. 4A according to embodiments of the present disclosure.
Figure 5A:
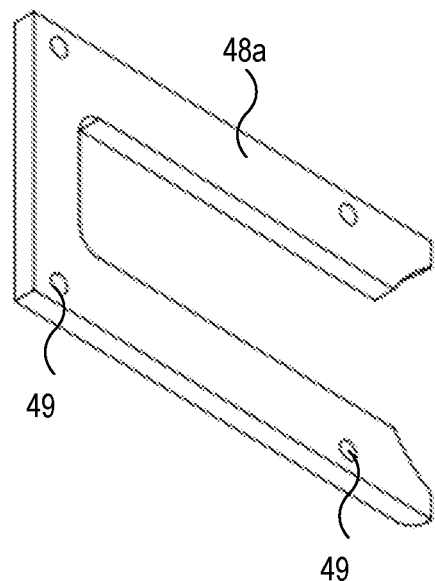
FIG. 5A shows a perspective view of a top bracket of the slit carrier assembly in FIG. 4A according to embodiments of the present disclosure.
Figure 5B:
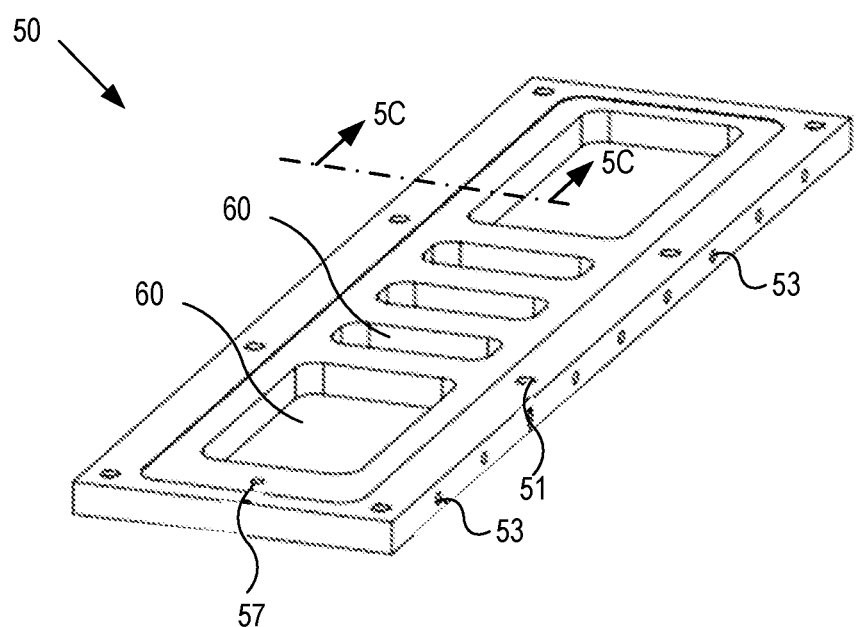
FIG. 5B shows a perspective view of a bottom bracket of the slit carrier assembly in FIG. 4A according to embodiments of the present disclosure.
Figure 5C:
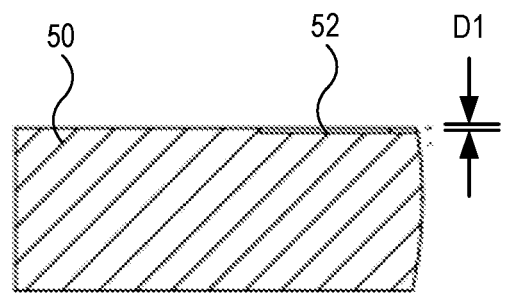
FIG. 5C shows a cross sectional view of the bottom bracket in FIG. 5B, taking along the line 5C-5C, according to embodiments of the present disclosure.
Figure 5D:
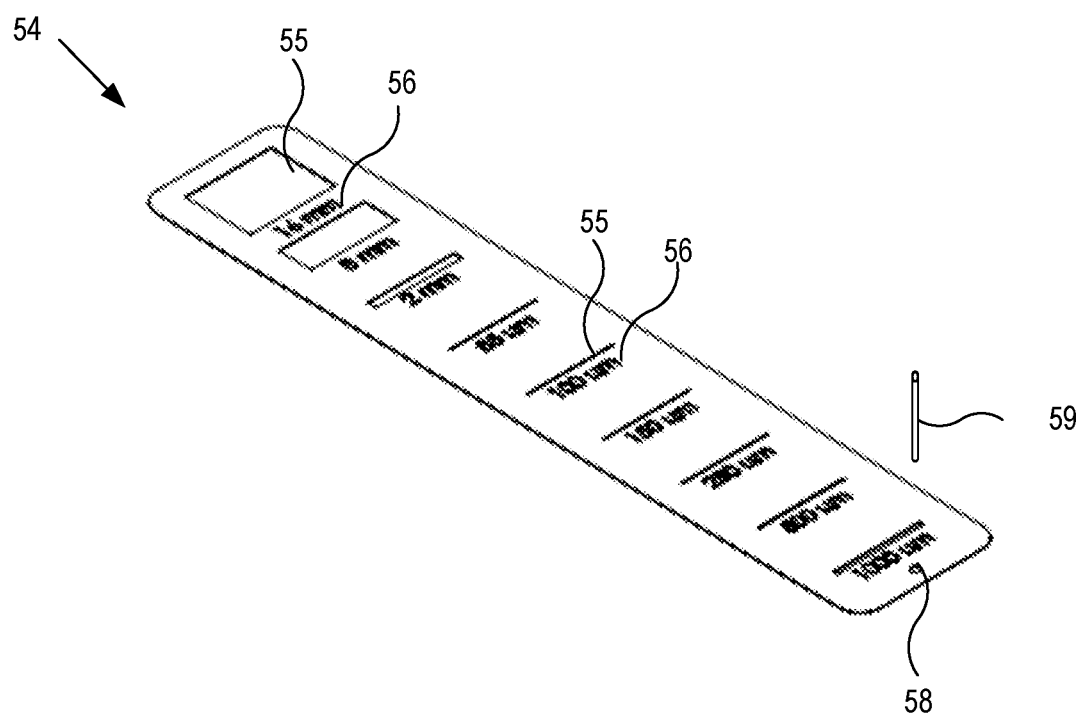
FIG. 5D shows a perspective view of a slit mask that may be included in the slit carrier assembly in FIG. 4A according to embodiments of the present disclosure.

In embodiments, the slit carrier assembly 46 may slide along the y (horizontal) direction relative to the holder 24. FIG. 4A shows a perspective view of the slit carrier assembly 46 according to embodiments of the present disclosure. FIG. 4B shows a side view of the slit carrier assembly 46 in FIG. 4A according to embodiments of the present disclosure. FIG. 5A shows a perspective view of a top bracket 48a of the slit carrier assembly 46 in FIG. 4A according to embodiments of the present disclosure. FIG. 5B shows a perspective view of a bottom bracket 50 of the slit carrier assembly 46 in FIG. 4A according to embodiments of the present disclosure. FIG. 5C shows a cross sectional view of the bottom bracket 50 in FIG. 5B, taking along the line 5C-5C, according to embodiments of the present disclosure. FIG. 5D shows a perspective view of a slit mask 54 that may be carried by the slit carrier assembly 46 in FIG. 4A according to embodiments of the present disclosure.

As depicted, the slit carrier assembly 46 may include one or more of: a pair of top brackets 48a and 48b; a bottom bracket 50; the slit mask 54; and a pin 59. In embodiments, the pair of top brackets 48a and 48b may be secured to the bottom bracket 50 by eight bolts/screws 47, where only one bolt/screw is shown in FIG. 4A for brevity. In embodiments, the top bracket 48a (or 48b) may include one or more holes 49 for receiving the screws 47 therein. In embodiments, the top bracket 48a may be separated from the other top bracket 48b by a gap 80. The width of the gap 80 may be determined such that a resolution target 76 (shown in FIG. 7) may be disposed in the gap 80.

In embodiments, the bottom bracket 50 may include multiple tapped holes 51 that the screws 47 engage. In embodiments, the bottom bracket 50 may include a hole 57 for receiving the pin 59 therein, such as dowel pin. In embodiments, the slit mask 54 may also include a hole 58 for receiving the pin 59 therein, i.e., the pin 59 may be used to align the slit mask 54 to the bottom bracket 50. In embodiments, the bottom bracket 50 may have a pocket cutout 52 to form a shoulder on which the slit mask 54 sits, where the depth D1 of the cutout 52 may be equal to the thickness of the slit mask 54. In embodiments, when the pair of top brackets 48a and 48b is secured to the bottom bracket by the screws 47, the pair of top brackets 48a and 48b may firmly hold the slit mask 54 in the pocket cutout 52. In embodiments, the bottom bracket 50 may include five rectangular holes/openings 60 that are positioned to allow the light passing through nine slits 55 in the slit mask 54 to proceed toward the camera body 12.

In embodiments, the slit mask 54, which may be formed of thin metal plate, may include multiple pairs of slit 55 and marking (index) 56, where each marking indicates the width of the corresponding slit. Since the slits 55 are marked, the operator can check the width of the slit that he selects. In embodiments, each slit 55 may have a fixed width and be precisely etched by a laser and as such, unlike the conventional continually adjustable slits, there is no confusion on the width of each slit 55.

In embodiments, the bottom bracket 50 may include multiple dimples 53 formed on both top and bottom side surfaces. FIG. 6 shows a cross sectional view of the IMSS assembly 20 in FIG. 2C, taken along the line 6-6, according to embodiments of the present disclosure. FIG. 6 also includes two inset diagrams that show enlarged views of two portions of the IMSS assembly 20. In embodiments, the slit carrier assembly 46 may be dimensioned to snugly fit inside the horizontal channel 38 of the holder 24. As the operator slides slit carrier assembly 46 relative to the holder 24, the vertical centerline of one of the slits 55 in the slit mask 54 may be lined up with a pair of dimples 53 formed on the top and bottom side surfaces of the bottom bracket 50, respectively.

In embodiments, the holder 24 may have a pair of spring-loaded ball-end set screws 62, where the two spring-loaded ball-end set screws 62 may face each other across the center of the longitudinal axis of the channel 38. In embodiments, when the vertical centerline of one of the slits 55 aligns with a pair of dimples, the balls of the two spring-loaded ball-end set screws 62 fit into the pair of dimples 53. In embodiments, this ball and socket mechanism may allow the operator to know that a slit is aligned and to read the corresponding marking 56 to check the width of the slit that he selects. Stated differently, based on the ball and socket mechanism, each pair of dimples 53 may index the corresponding slit and align the slit relative to the holder 24.

In embodiments, each pair of dimples 53 may correspond to a slit such that a reference line drawn from the deepest portion of one dimple to the deepest portion of the opposing dimple passes through the center of the slit that the pair of dimples is indexing. When the balls of the pair of spring-loaded ball-end screws 62 engage two opposing dimples, the holder 24 may pass light through the slit that corresponds to the two dimples. In this way, each time the operator selects a slit among the multiple slits, the center of the selected slit may be in the same place in the IMSS assembly 20 and on the streak camera photo cathode.

In embodiments, a portion of the ball of each set screws 62 may extrude into the horizontal channel 38 and engage one of the dimples 53 when the dimple is in the vertical centerline of the slit 55. In FIG. 5B, the bottom bracket 50 of the slit carrier assembly 46 may include nine dimples 53 on each of the top and bottom side surfaces, where each of the nine pairs of dimples may correspond to one of the nine slits 55 in the slit mask 54. It should be apparent to those of ordinary skill in the art that the bottom bracket 50 may have other suitable number of dimples, slits, pinholes or other masks of varying shape, size, or position.

Figure 7:
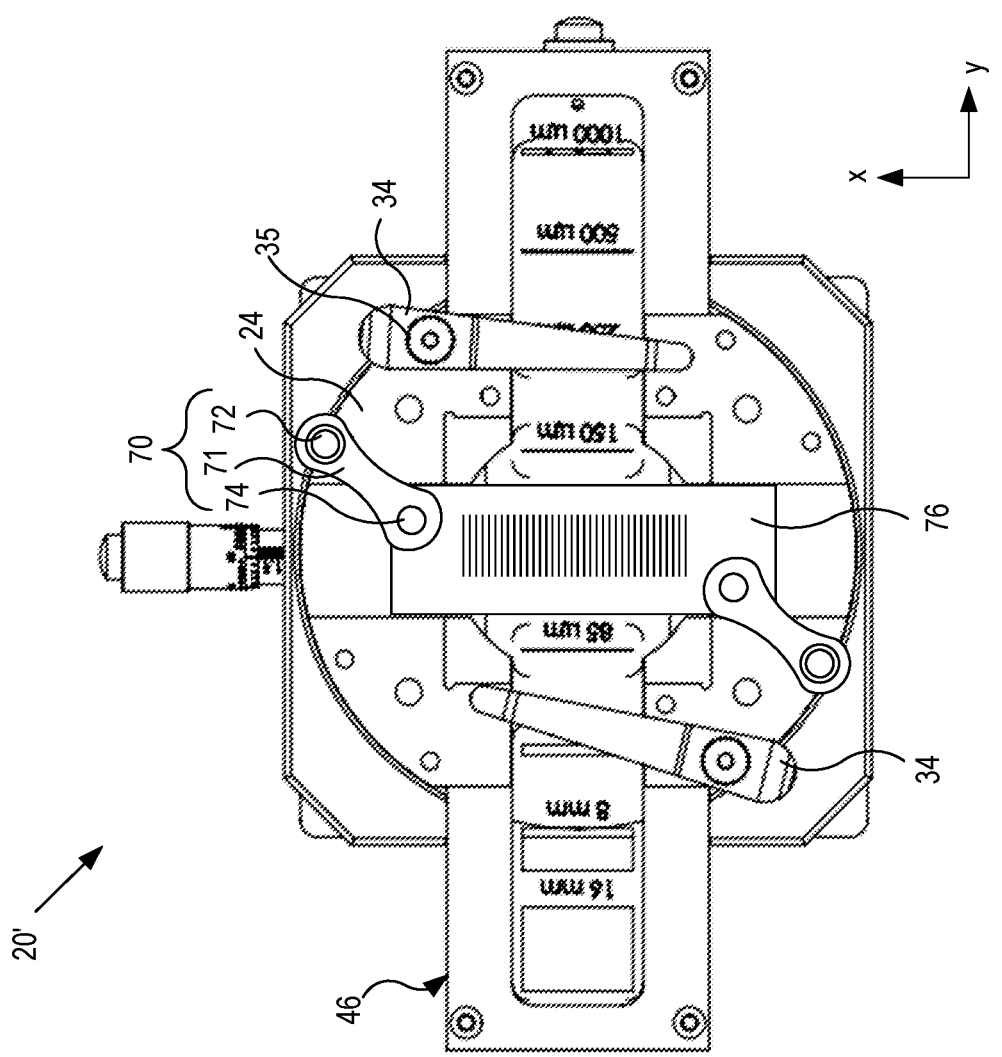
FIG. 7 shows a front view of an IMSS assembly according to embodiments of the present disclosure.

To set the focus of the streak camera 10, the operator may want to use a resolution (or calibration) target disposed on the slit. Typically, resolution masks need to be small enough and often flexible enough to fit in the opening on the slit housing and then be tapped to the slit. In the conventional adjustable slit systems, it may be difficult to access the slit and secure the resolution target to the slit. In contrast, in embodiments, the vertical channel 40 of the holder 24 may be used to hold a resolution or calibration target while the horizontal channel 38 may be simultaneously holding the slit carrier assembly 46. FIG. 7 shows a front view of the IMSS assembly 20' according to embodiments of the present disclosure. As depicted, the IMSS assembly 20' may be similar to the IMSS assembly 20, with the difference that a resolution target 76 may be disposed in the vertical channel 40 of the holder 24. It is noted that the slit carrier assembly 46 may be also disposed in the horizontal channel 38 of the holder 24.

In embodiments, a pair of mask holding arm units 70 may be mounted on the holder 24, where each mask holding arm unit 70 may include: a mount 72 detachably secured to the holder 24; an arm 71 rotatably secured to the mount 72 at the proximal end; and a nylon tipped set screw 74 disposed at the distal end of the arm. In embodiments, each mount 72 may engage one of the tapped holes 37. In embodiments, the nylon tipped set screw 74 may be tightened until it makes contact with the resolution target 76, securing the resolution target against the bottom of channel 40 so that the resolution target 76 may be held in place relative to the holder 24.

As described in conjunction with FIG. 4B, the width of the gap 80 may be determined such that a resolution target 76 may be disposed in the gap 49, i.e., the rear surface of the resolution target 76 may contact the front surface of the slit mask 54. Stated differently, the vertical channel 40 may have its bottom surface at the slit image plane that is same as the front surface of the slit mask 54. By way of example, the resolution target 76 may be a ten line pair per mm Ronchi Ruling (lp/mm RR) resolution target and have the standard dimension of 1"×3". In this case, the width of the gap 80 may be slightly larger than 1 inch so that the resolution target 76 may be disposed in the gap 80.

It is noted that other types of slides/masks may be installed in the vertical channel 40 in place of the resolution target 76. It is also noted that the slit carrier assembly 46 may be removed and only the resolution target 76 may be installed in the vertical channel 40 while setting the focus of the camera 10.

Figure 8:
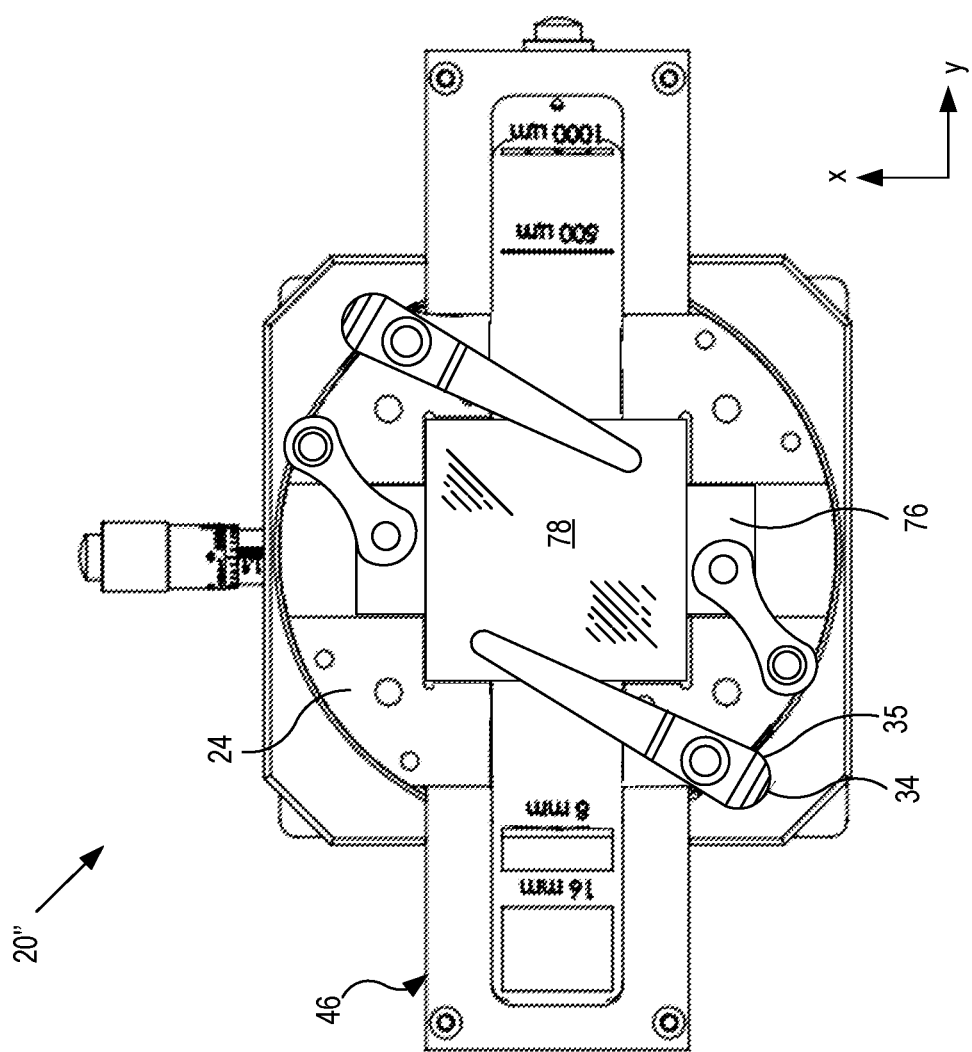
FIG. 8 shows a front view of an IMSS assembly according to embodiments of the present disclosure.

In embodiments, the front cutout 42 may define a shoulder that a 2"×2" square optic component can sit on. For instance, the projection area of the shoulder may include four corners of a square so that a 2 inch×2 inch diffuser may be installed on the shoulder. FIG. 8 shows a front view of an IMSS assembly 20" according to embodiments of the present disclosure. As depicted, the IMSS assembly 20" may be similar to the IMSS assembly 20', with the differences that a diffuser 78 may be installed on the shoulder defined by the front cutout 42 and that the pair of spring clips 34 may apply pressure to the diffuser 78 against the holder 24 so that the diffusor 78 is firmly held on the shoulder. In embodiments, the three optical elements 46, 76 and 78 may be mounted on the holder 24 independently of each other. It is noted that the holder 24 may include other suitable shape and size of the cutout 42.

When performing experiments with the streak camera 10, it is often desirable to mount a large assembly containing an array of fibers, for example, at the slit plane. In embodiments, the holder 24 may provide an access to a flat slit plane in a circle of 1.89" diameter and along the diagnostic channel described above. Also, in embodiments, the holder 24 may have eight tapped holes 37 and four tapped holes 39, where these holes may be used to mount various components on the hold 24, such as a data acquisition assembly.

As discussed above, the conventional continually adjustable slit has mechanical problems: springs may come free so that the opposing slit blades may become loose and not be perfectly parallel to each other. In embodiments, the multiple slit slider assemblies 20, 20' and 20" may not have the conventional mechanical problems since each of the multiple slit slider assemblies 20, 20' and 20" has just two moving parts; the slit carrier assembly 46 in the holder 24; and the balls in the pair of spring-loaded ball-end set screws 62 that index the slits.

In embodiments, the multiple slit slider assemblies 20, 20' and 20" may provide several advantages: (1) In addition to holding and positioning the slit carrier assembly 46, the holder 24 may also include a vertical slot to hold the slide/mask 76, such as standard 1"×3" Ronchi Ruling resolution target or other calibration slide/mask. The slide/mask 76 may be arranged on the same plane as the slit mask 54 carried by the slit carrier assembly 46. In embodiments, the slit carrier assembly 46 and slide/mask 76 may be used at the same time, and the bottom surface of the slide/mask 76 may touch the top surface of the slit mask 54. 2) In embodiments, the holder 24 may hold an optical element having a square shape, such as 2"×2" diffuser, neural density filter, or other spectral filter. 3) In embodiments, the holder 24 may lock all axis of translation and rotation. 4) In embodiments, the holder 24 may provide direct access to the slit mask 54 and include multiple available tapped holes, allowing the operator to hold various objects close to or in contact with the slit mask 54.

Uses of the Invention: As shown in FIG. 1, the multiple slit slider assemblies 20, 20' and 20" may be used for any suitable optical device 10, replacing conventional variable slits, variable pinholes, adjustable slits, and adjustable irises. By way of example, the optical device 10 may include spectrometer, x-ray, pinhole camera, and panorama camera, etc.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A slit slider assembly, comprising:
a holder including a first channel and a pair of set screws that each has a ball partially extruding into the first channel; and
a slit carrier assembly configured to be slidably disposed in the first channel and carry a slit mask that includes a plurality of slits, the slit carrier assembly including a plurality of dimples for receiving a portion of the ball;
wherein, when the balls of the pair of set screws engage two dimples of the plurality of the dimples, the holder passes a light through one of the plurality of slits that corresponds to the two dimples.

2. The slit slider assembly of claim 1, wherein the slit carrier assembly includes a bottom bracket that has the plurality of dimples and a top bracket detachably secured to the bottom bracket and wherein the bottom bracket includes a cutout that the slit mask sits in.

3. The slit assembly of claim 2, wherein the bottom bracket includes a first hole and the slit mask includes a second hole and wherein the slit carrier assembly further includes a pin that is configured to pass through both the first and second holes.

4. The slit assembly of claim 1, wherein the slit mask includes a plurality of markings and wherein each of the plurality of markings indicates a size of a corresponding slit of the plurality of slits.

5. The slit assembly of claim 1, wherein the two dimples are disposed along a centerline of the corresponding slit.

6. The slit assembly of claim 1, wherein the holder includes a second channel that extends in a direction normal to the first channel and configured to receive a target therein.

7. The slit assembly of claim 6, wherein the second channel is dimensioned so that a bottom surface of the target is in contact with a top surface of the slit mask when the slit mask and target are installed in the first and second channels, respectively.

8. The slit assembly of claim 6, further comprising:
a mask holding arm unit rotatably secured to the holder and including a screw disposed at a distal end thereof; wherein the screw is configured to secure the target to the holder.

9. The slit assembly of claim 1, wherein the holder further includes:
a cutout for receiving a disk shaped object therein.

10. The slit assembly of claim 9, wherein the holder further includes:
a spring clip rotatably secured to the holder at a proximal end of the spring clip and configured to apply a pressure to the disk shaped object to secure the disk shaped object to the holder.

11. The slit assembly of claim 1, further comprising:
a translation stage including a base plate and a stage plate slidably mount on the stage plate; and
a mechanism to move the stage plate relative to the base plate,
wherein the holder is detachably secured to the stage plate.

12. An optical device, comprising:
a slit slider assembly for passing a light therethrough; and
a body attached to the slit slider assembly and configured to process the light;
the slit slider assembly, comprising:
a holder including a first channel and a pair of set screws that each has a ball partially extruding into the first channel; and
a slit carrier assembly configured to be slidably disposed in the first channel and carry a slit mask that includes a plurality of slits, the slit carrier assembly including a plurality of dimples for receiving a portion of the ball;
wherein, when the balls of the pair of set screws engage two dimples of the plurality of the dimples, the holder passes the light through one of the plurality of slits that corresponds to the two dimples.

13. The optical device of claim 12, wherein the slit carrier assembly includes a bottom bracket that include the plurality of dimples and a top bracket detachably secured to the bottom bracket and wherein the bottom bracket includes a cutout that the slit mask sits in.

14. The optical device of claim 12, wherein the two dimples are disposed along a centerline of the corresponding slit.

15. The optical device of claim 12, wherein the holder includes a second channel that extends in a direction normal to the first channel and configured to receive a target therein.

16. The optical device of claim 15, wherein the second channel is dimensioned so that a bottom surface of the target is in contact with a top surface of the slit mask when the slit mask and target are installed in the first and second channels, respectively.

17. The optical device of claim 15, further comprising:
- a mask holding arm unit rotatably secured to the holder and including a screw disposed at a distal end thereof;
- wherein the screw is configured to secure the target to the holder.

18. The optical device of claim 12, wherein the holder further includes:
- a cutout for receiving a disk shaped object therein.

19. The optical device of claim 18, wherein the holder further includes:
- a spring clip secured to the holder at a proximal end of the spring clip and configured to apply a pressure to the disk shaped object to secure the disk shaped object to the holder.

20. The optical device of claim 12, wherein the optical device is one selected from the group consisting of streak camera, spectrometer, x-ray, pinhole camera, and panorama camera.

* * * * *